US006309098B1

(12) United States Patent
Wong

(10) Patent No.: US 6,309,098 B1
(45) Date of Patent: Oct. 30, 2001

(54) CONTACTLESS-IC-CARD RECEIVE AND READ-WRITE MECHANISM FOR AN ON-STREET PARKING METER

(76) Inventor: Ye Ping Wong, 2Fl. 133, Sec. 1, Chung Ching S.Rd., Taipei (TW)

( * ) Notice: Subject to any disclaimer, the term of this patent is extended or adjusted under 35 U.S.C. 154(b) by 0 days.

(21) Appl. No.: 09/545,508

(22) Filed: Apr. 7, 2000

(51) Int. Cl.[7] ................................ G04F 1/04; G07F 7/00; B60Q 1/48; G08G 1/14

(52) U.S. Cl. ............................ 368/94; 194/205; 194/211; 194/239; 194/340; 194/932.2

(58) Field of Search .............................. 368/90; 194/205, 194/210, 211, 215–219, 239–240; 340/932.2, 942, 943

(56) References Cited

U.S. PATENT DOCUMENTS 4,880,097 * 11/1989 Speas .................................. 194/239
5,442,348 * 8/1995 Mushell ........................... 340/932.2
5,500,517 * 3/1996 Cagliostro ........................... 235/486
5,841,369 * 11/1998 Sutton et al. ..................... 340/932.2
6,111,522 * 8/2000 Hiltz et al. ........................ 340/932.2

* cited by examiner

*Primary Examiner*—Vit Miska
(74) *Attorney, Agent, or Firm*—Dougherty & Troxell

(57) ABSTRACT

A contactless-smart-IC-card receive and read-write mechanism for an on-street parking meter. The mechanism includes a nested cartridge set consisting of a card read-write unit and a card receiver. The card read-write unit further includes an outer case having an induction coil and a circuit board attached to one outer side of the outer case. The card receiver is removably nested in the outer case for an IC card to insert thereinto. The circuit board has different circuits provided thereon for controlling power supply to correctly complete card reading and overwriting. A detecting switch is mounted on the outer case to detect the existence of the IC card in the card receiver. Only when a correct IC card in the receiver is detected will a high frequency power supply circuit be actuated for the card read-write unit to read and overwrite data or amount stored in the IC card. The card read-write unit is not affected by external dust or rainwater to cause error operation. Any clogged or damaged card receiver may be easily removed from the read-write unit for maintenance or replacement.

5 Claims, 5 Drawing Sheets

CONTACTLESS-IC-CARD RECEIVE AND READ-WRITE MECHANISM FOR AN ON-STREET PARKING METER

BACKGROUND OF THE INVENTION

The present invention relates to an improvement made to an electronic on-street parking meter, and more particularly to a contactless IC card receive & read-write mechanism for an induction type on-street parking meter.

A conventional on-street parking meter in early stage mechanically operates to count and collect parking charges. Such mechanical parking meter includes very complicate parts and components and is therefore uneasy to maintain. Moreover, such mechanical parking meter accepts only coins and not the convenient cards. In recent years, on-street parking meter has incorporated electronic read unit to accept payment by card. Currently, most on-street parking meters provided by various manufacturers of different countries are designed to accept payment by contact smart IC card. A card receiver provided with the parking meter for receiving the IC card is subject to damages caused by external humidity and dust because the parking meter is exposed to outdoor environment. Moreover, the current on-street parking meter accepting IC card has the following two disadvantages:

1. In order to accept an IC card as a payment means, each on-street parking meter is equipped with a card slot and a card reader that are actually a unitary body in the parking meter. In the event the card slot on the card reader is clogged or damaged by foreign matters, it is necessary to dismount or even replace almost the entire parking meter to repair the card slot and the card reader.
2. In a rainy day, when an IC card is inserted into the card reader on the parking meter via the card slot, it is possible rainwater at the card slot would wet electric contact on the surface of the IC card and cause short circuit or poor electrical contact of the IC card with the card reader.

As to another type of smart IC card, that is, contactless smart IC card or induction-type smart IC card, it is currently not easily accepted for using in the existing on-street electronic parking meter for the following reasons:

1. With the existing technique, a non-street parking meter mounted outdoors and accepting the contactless or induction-type IC card includes an induction coil that continuously emits electromagnetic-wave signals to detect for any card approaching to the card reader of the on-street parking meter. That is, the parking meter consumes considerable power and the batteries provide therein simply could not supply the power for a prolonged time. Frequent replacement of batteries is therefore needed and inevitably endangers our living environment.
2. Generally, two parking meters are mounted side by side on the same one pipe standard and are therefore very close in their position. When a contactless IC card is unexpectedly moved toward an adjacent parking meter, it is possible the adjacent parking meter is induced to make incorrect read-out and write-in of data and causes confuse and trouble in paying the parking charges

SUMMARY OF THE INVENTION

It is therefore a primary object of the present invention to provide a dustproof and waterproof contactless-smart-IC-card receive and read-write mechanism for on-street parking meter.

Another object of the present invention is to provide a contactless-smart-IC-card receive and read-write mechanism for on-street parking meter that includes separable card receiver and induction-type card read-write unit. Therefore, a clogged or damaged card receiver alone may be easily removed from the parking meter for repair or replacement without the need of opening the housing of the parking meter or changing the card read-write unit.

A further object of the present invention is to provide a contactless-smart-IC-card receive and read-write mechanism for on-street parking meter that includes a detecting switch to determine correct receiving of a correct IC card. When there is not an IC card or a correct IC card inserted into the card receiver, the parking meter is in a standby state to consume only very small amount of power.

To achieve the above and other objects, the present invention mainly includes a nested cartridge set consisting of a card read-write unit and a card receiver. The card read-write unit further includes an outer case provided with an induction coil and a circuit board attached to the outer case at predetermined position. The card receiver is removably fitted in the outer case for an IC card to insert thereinto. The circuit board has different circuits provided thereon for controlling power supply to correctly complete card reading and overwriting. A detecting switch is mounted on the outer case to detect the existence of the IC card in the card receiver. Only when a card in the receiver is detected will a high frequency power supply circuit be actuated for the card read-write unit to read and overwrite data or amount stored in the IC card. In the event no IC card or an incorrect IC card is detected being inserted into the card receiver, the parking meter is in a standby state without consuming too much power. The induction coil and other circuits would not be affected by external dust or rainwater to cause error operation. And any clogged or damaged card receiver may be easily separated from the read-write unit for maintenance or replacement.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
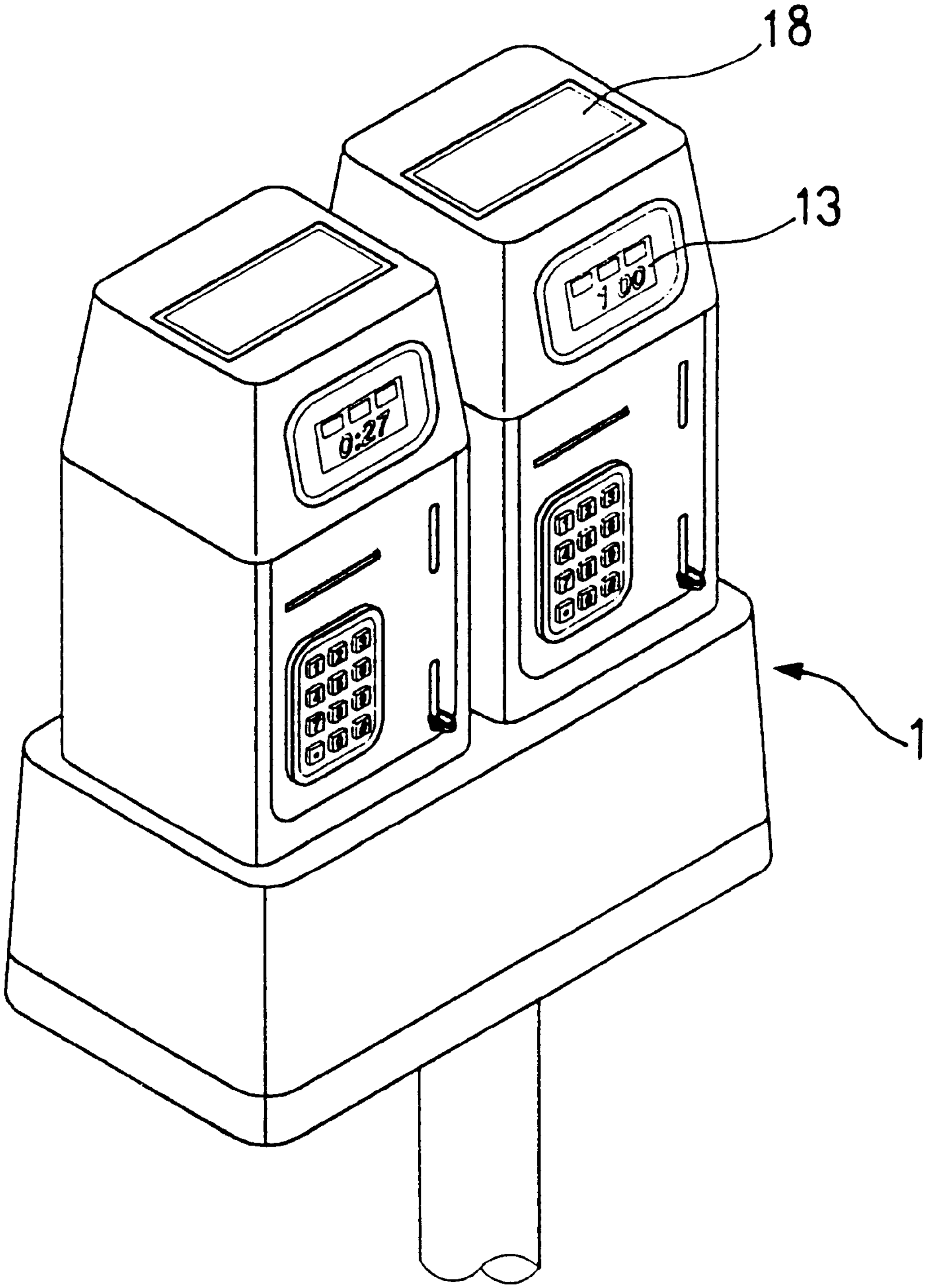
FIG. 1 is a perspective of an on-street parking meter having the present invention incorporated therein.
Figure 2:
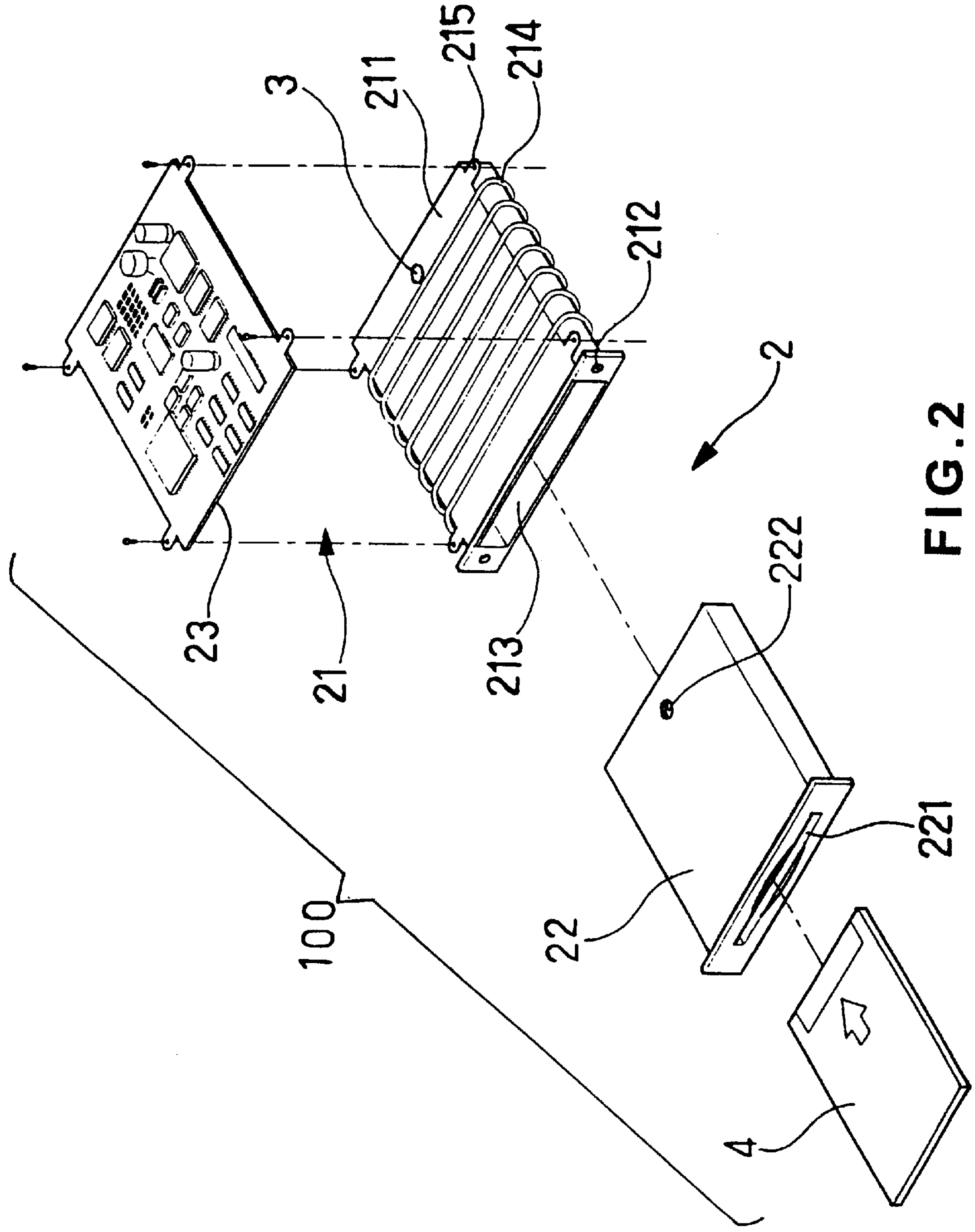
FIG. 2 is an exploded perspective of the present invention.

Please refer to FIGS. 1 to 4. The present invention relates to a contactless-smart-IC-card receive & read-write mechanism 100 for an electronic-type on-street parking meter 1. For simplicity purpose, the electronic-type on-street parking meter 1 is hereinafter referred to as the "parking meter" 1, the contactless-smart-IC-card receive & read-write mechanism 100 referred to as the "read-write mechanism" 100 or "the mechanism" 100, and the contactless smart IC card 4 referred to as the "contactless IC card" or the "IC card" 4.

Basically, the parking meter 1 is internally provided with a microprocessor 11, a memory 12, an LCD display 13, a state detector 14, a high frequency power supply circuit 15, and a filter demodulation circuit 16. A rechargeable battery 17 is used to supply power needed by the parking meter 1. Moreover, a solar panel 18 and a charging circuit 19 are incorporated as an auxiliary charging set.

The read-write mechanism 100 of the present invention mainly includes a nested-type cartridge set 2 and a detecting switch 3.

The nested-type cartridge set 2 includes a card read-write unit 21 and a card receiver 22. The card read-write unit 21 further includes an outer case 211 and a circuit board 23. The outer case 211 defines a receiving space 213 into which the card receiver 22 is removably inserted to fitly nest in the outer case 211. As can be clearly seen from FIG. 2, the outer case 211 is provided with an induction coil 214 that is, for example, wound around the outer case 211. First fixing holes 212 are provided at a front side of the outer case 211 for connecting the outer case 211 to an inner side of a housing of the parking meter 1 by threading screws through the first fixing holes 212, and second fixing holes 215 are provided at, for example, four top corners of the outer case 211, so that the circuit board 23 is connected to a top surface of the outer case 211 by means of screws. The above-mentioned state detector 14, the high frequency power supply circuit 15, and the filter demodulation circuit 16 are provided on the circuit board 23 and are therefore fixed to an outer side of the outer case 211. The card receiver 22 is provided at a front end with a card slot 221 via which the contactless IC card 4 is inserted into the card receiver 22.

Figure 3:
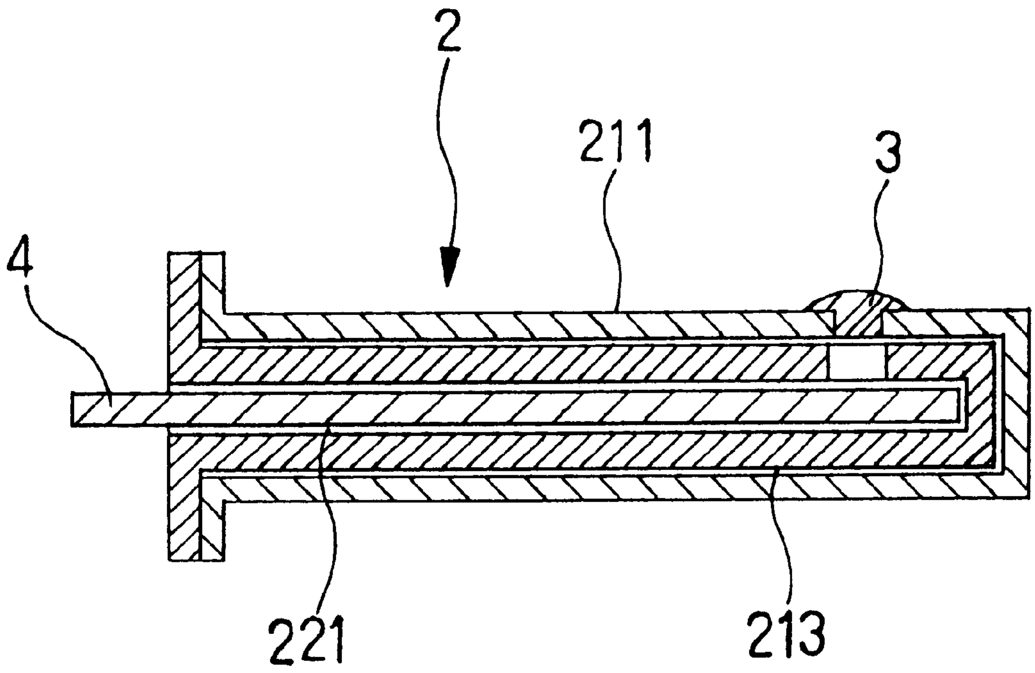
FIG. 3 is a side sectional view of the present invention in an assembled state.
Figure 4:
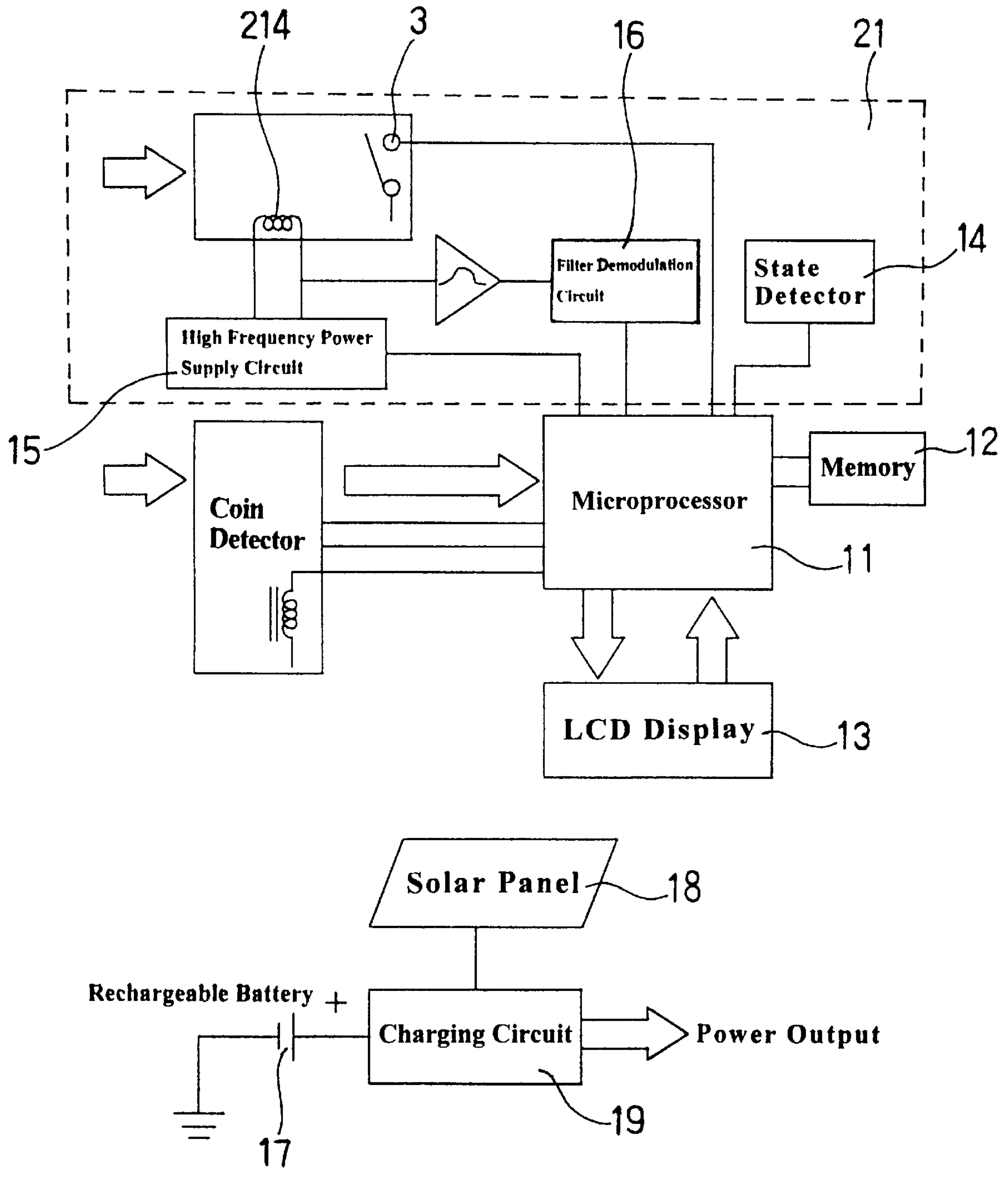
FIG. 4 is a block diagram of the present invention.
Figure 5:
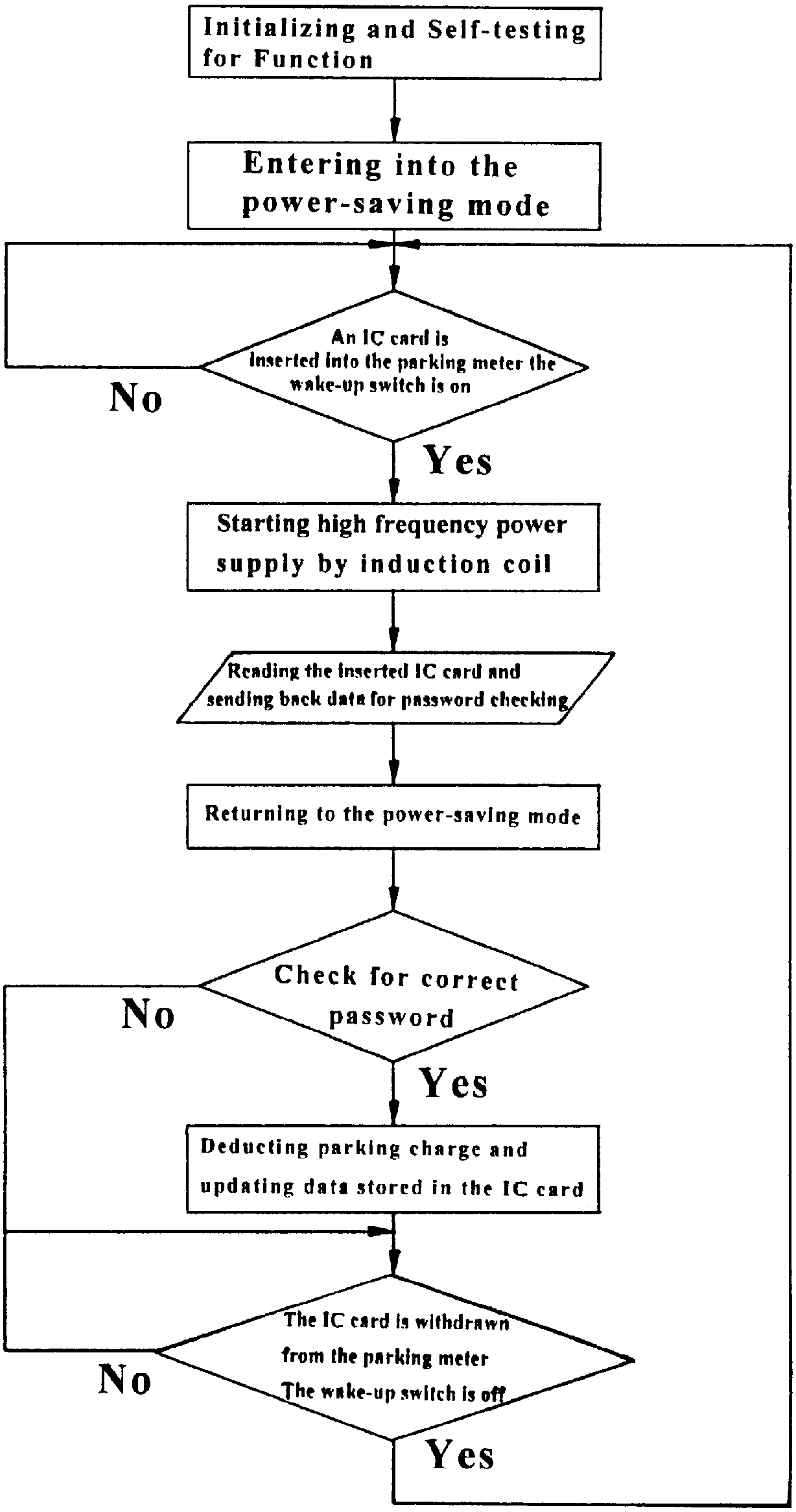
FIG. 5 is a flowchart of the operating procedures of the present invention.

The detecting switch 3 is provided on the top of the outer case 211 at a predetermined position. The detecting switch 3 may be either a mechanical-type contact microswitch or a photoelectronic induction switch. In a preferred embodiment of the present invention, the detecting switch 3 is mounted near a top rear portion of the outer case 211, as shown in FIG. 3. Meanwhile, the card receiver 22 is also provided near a top rear portion with a through hole 222 corresponding to the detecting switch 3, so that the detecting switch 3 could contact with or sense the contactless IC card 4 via the through hole 222 when the latter is fully inserted into the card receiver 22. According to the present invention, a distance between the detecting switch 3 and the IC card 4 inserted into the card read-write unit 21 is minimized to be only about 1.5 cm, and this allows the present invention to achieve the best data read and write effect while consumes the least power.

Whereby, when a card user inserts the contactless IC card 4 into the card receiver 22 via the card slot 221, the detecting switch 3 is actuated to enable the induction coil 214 and other electronic components on the circuit board 23 to generate electromagnetic waves that are employed to read or write data from or into the IC card 4. Therefore, the card read-write unit 21 does not directly electrically contact with the IC card 4 and would not be affected by dust and rainwater possibly on the IC card 4.

When the parking meter 1 is in a standby state, that is, there is not an IC card 4 inserted into the card receiver 22, power supplied to the card read-write unit 21 is turned off until there is an IC card 4 inserted into the card receiver 22 and detected by the detecting switch 3. And, in the event an inserted IC card is detected as an incorrect IC card, power supplied to the card read-write unit 21 would be turned off, too. And, only when the card read-write unit 21 is supplied with power, will electronic components and circuits provided on the circuit board 23 be enabled to read and overwrite data stored in the IC card 4, including entries and amounts thereof. That is, the read-write mechanism 100 is superior to the conventional on-street parking meter in that it does not consume large amount of power in the standby state and avoids possible error reading of an incorrect contactless IC card 4.

Moreover, since the card receiver 22 is a hollow cartridge removable from the outer case 211 of the card read-write unit 21, any card receiver 22 that is damaged due to foreign matters clogged therein could be easily pulled out of the outer case 211 and replaced with a good one. That is, any damaged or failed card receiver 22 of the read-write mechanism 100 can be easily independently maintained or repaired without the need to open a housing of the parking meter or change the entire read-write mechanism 100.

In order to ensure correct reading of an correct IC card 4 by the read-write mechanism 100 and reduced power consumption of the read-write mechanism 100 in the standby state, an internal programming would be enabled to automatically initialize a basic function test when the parking meter 1 is duly mounted and supplied with power.

If the test confirms that the parking meter 1 is normal in every aspects, the parking meter 1 would automatically turn off the high frequency power supply circuit 15, the filter demodulation circuit 16 and the state detector 14, so that the card read-write unit 21 is in a power-saving mode until a contactless IC card 4 is inserted into the card receiver 22 and detected by the detecting switch 3. At this point, the high frequency power supply circuit 15, the filter demodulation circuit 16 and the state detector 14 are waken up and supplied with high-frequency energy that, in accordance with the electromagnetic principle, would induce the IC card 4 to obtain required working current. Thereafter, the components and circuits provided on the circuit board 23 allow the card read-write unit 21 to read data sent from the IC card 4. After all the data from the card 4 have been read, the card read-write unit 21 returns to the power-saving mode and checks for a correct password. If it is determined the password is correct, it means the IC card 4 inserted into the card receiver 22 is a correct card and the card read-write unit 21 is supplied with power again to handle deduction of an amount and update of data stored in the card 4. On the other hand, if it is determined the password is incorrect, it means the inserted card is incorrect and the card read-write unit 21 in the parking meter 1 would not operate and keeps in the power-saving mode. This type of detection manner effectively prevents the parking meter 1 from accepting incorrect IC card 4 and wasting power to read the incorrect card 4.

The following are some of the advantages of the read-write mechanism 100 of the present invention for an on-street parking meter 1:

1. It has simple structure and needs low power consumption.
2. In the event of any trouble or failure, the card receiver 22 for receiving the IC card 4 may be separately removed from the card read-write unit 21 for replacement, maintenance or repair.
3. The read-write mechanism 100 would not be affected by external dust or rainwater possibly brought in by the inserted IC card 4.
4. A distance between the detecting switch 3 and the IC card 4 inserted into the card read-write unit 21 is minimized to be only about 1.5 cm, and this allows the present invention to achieve the best data read and write effect while consumes the least power.

The present invention has been described in an illustrative manner and many modifications and variations of the present invention are possible in light of the above teachings. Therefore, it is to be understood that within the scope of the appended claims, the invention may be practiced otherwise than as specifically described.

What is claimed is:

1. A contactless-smart-IC-card receive & read-write mechanism for an electronic-type on-street parking meter, comprising a nested-type cartridge set mounted in a housing of said parking meter and a detecting switch;

said nested-type cartridge set including a card read-write unit and a card receiver into which said IC card is inserted;

said card read-write unit including electronic induction means that is separate from said card receiver and is not exposed to external environment and is therefore not subject to damage or failure possibly caused by dust and rainwater brought in by an IC card inserted said card receiver, and said electronic induction means achieving signal transmission to and from said IC card through induction by electromagnetic wave;

said card receiver being removably nested in said card read-write unit, such that it can be easily removed from said read-write unit for maintenance, repair or replacement purpose; and said detecting switch being mounted on said card read-write unit within an area corresponding to said IC card that has been correctly inserted into said card receiver;

whereby said card read-write unit is normally in a standby state that consumes only a very low power and is actuated from said standby state only in two conditions, a first of which being when an IC card is inserted into said card receiver and detected by said detecting switch, so that data on said inserted IC card could be read by said card read-write unit, and a second of said two conditions for actuating said card read-write unit being when a password for said inserted IC card has been verified as correct, so that data stored in said inserted IC card could be read and overwritten by said card read-write unit.

2. A contactless-smart-IC-card receive & read-write mechanism for an electronic-type on-street parking meter as claimed in claim 1, wherein said card read-write unit includes an outer case in which said card receiver is removably nested, said electronic induction means including an induction coil and a circuit board attached to said outer case, and said detecting switch being located near a top rear portion of said outer case to correspond to a through hole formed on said card receiver for detecting an inserted IC card via said through hole.

3. A contactless-smart-IC-card receive & read-write mechanism for an electronic-type on-street parking meter as claimed in claim 1, wherein said detecting switch is a mechanical type contact switch.

4. A contactless-smart-IC-card receive & read-write mechanism for an electronic-type on-street parking meter as claimed in claim 1, wherein said detecting switch is a photoelectronic induction switch.

5. A contactless-smart-IC-card receive & read-write mechanism for an electronic-type on-street parking meter as claimed in claim 1, wherein said parking meter is internally provided on said circuit board of said card read-write unit with a microprocessor, a memory, an LCD display, a state detector, a high frequency power supply circuit, and a filter demodulation circuit, and said parking meter is also provided with a rechargeable battery for supplying power needed by said parking meter and an auxiliary charging set including a solar panel and a charging circuit.

* * * * *